United States Patent [19]
Griffiths

[11] Patent Number: 4,550,711
[45] Date of Patent: Nov. 5, 1985

[54] PULSE COMBUSTION DEEP FAT FRYER

[75] Inventor: James C. Griffiths, Cleveland, Ohio

[73] Assignee: Gas Research Institute, Chicago, Ill.

[21] Appl. No.: 559,943

[22] Filed: Dec. 9, 1983

[51] Int. Cl.[4] .............................................. A47J 27/00
[52] U.S. Cl. ................................. 126/391; 126/360 R; 126/343.5 A; 431/1
[58] Field of Search ............... 126/391, 360 R, 350 R, 126/343.5 R, 343.5 A; 99/403, 409; 431/1; 37/12; 122/50, 44 A, 116, 23

[56] References Cited

U.S. PATENT DOCUMENTS

| | | | |
|---|---|---|---|
| 2,176,869 | 10/1939 | Childs .................................. | 126/391 |
| 2,290,784 | 7/1942 | Turpin .......................... | 126/343.5 A |
| 2,452,472 | 10/1948 | Keating ................................ | 126/391 |
| 3,086,512 | 4/1963 | Williams et al. .............. | 126/343.5 A |
| 3,190,340 | 6/1965 | Fritsch ..................................... | 431/1 |
| 3,263,596 | 8/1966 | Thomas .......................... | 126/391 X |
| 4,409,957 | 10/1983 | Muhammad ................. | 126/343.5 R |

FOREIGN PATENT DOCUMENTS

| | | | |
|---|---|---|---|
| 1220448 | 5/1960 | France ................................. | 126/391 |
| 2098465 | 11/1982 | United Kingdom .................. | 99/403 |

Primary Examiner—Randall L. Green
Attorney, Agent, or Firm—Pearne, Gordon, Sessions, Granger, Tilherry

[57] ABSTRACT

A pulse combustion burner and heat exchanger for immersion in a deep fat fryer vessel. The geometry and juxtaposition of the burner and heat exchanger afford a compact assembly of exceptionally high efficiency. The burner is in the form of a horizontal tube and the heat exchanger for the combustion products is in the form of a bottomless, topless rectangular box surrounding the burner.

8 Claims, 4 Drawing Figures

PULSE COMBUSTION DEEP FAT FRYER

BACKGROUND OF THE INVENTION

The invention relates to combustion heaters, and, in particular, to gas fired pulse combustion immersion heaters.

PRIOR ART

Deep fat fryers are widely used in restaurants, fast food stores and other commercial establishments. Typically, such fryers comprise a vessel in which a quantity of cooking oil is maintained in a predetermined temperature range. U.S. Pat. Nos. 2,912,975 to Del Francia and 3,760,793 to Anetsberger et al. disclose types of underfired deep fat fryers. U.S. Pat. No. 4,350,140 to Hamilton Jr. discloses a tube burner in a deep fat fryer and U.S. Pat. No. 3,712,289 discloses an infrared radiant gas burner for a deep fat fryer. These and other prior frying units have been heated with natural gas or other gaseous fuels. Such units have realized the economies of natural gas fuels but have not always operated at a high efficiency level.

SUMMARY OF THE INVENTION

The invention provides a pulse combustion gaseous fuel heater assembly having a structural arrangement particularly suited for immersion in a deep fat fryer. The geometry of the burner combustion chamber and heat exchanger greatly improves burner efficiency. This geometry includes a combustion chamber in the form of a horizontal cylindrical tube and a pair of relatively narrow return passages forming major surfaces of the heat exchanger symmetrically disposed on opposite sides of the combustion chamber. The flow of combustion products exiting the combustion chamber is divided in an end wall manifold and directed to flow in a reversed direction through the return passages. The downstream ends of the return passages are conveniently connected by a second end wall manifold to an exhaust decoupler/muffler chamber which shares a wall with the frying vessel.

As disclosed, the heat exchanger return passages and the end wall manifolds are arranged in the configuration of a rectangular box without a top and bottom. This configuration, when immersed in the cooking oil, provides relatively large surface areas to promote convection currents of the oil both inside and outside the box for efficient heat transfer. The return passages forming the sides of the heat exchanger box are relatively narrow so that a high degree of turbulence of the combustion products is developed in this zone. This turbulence produces a scrubbing action of the combustion gases at the internal surfaces of these passages to reduce stagnation of the gasses at these critical areas and thereby achieve an exceptionally high degree of heat transfer. Performance of the burner assembly is also enhanced by matching the total cross-sectional area of the return passages to the downstream connector pipes which conduct combustion products to the exhaust decoupler/muffler chamber.

DESCRIPTION OF THE PREFERRED EMBODIMENT

Figure 1:
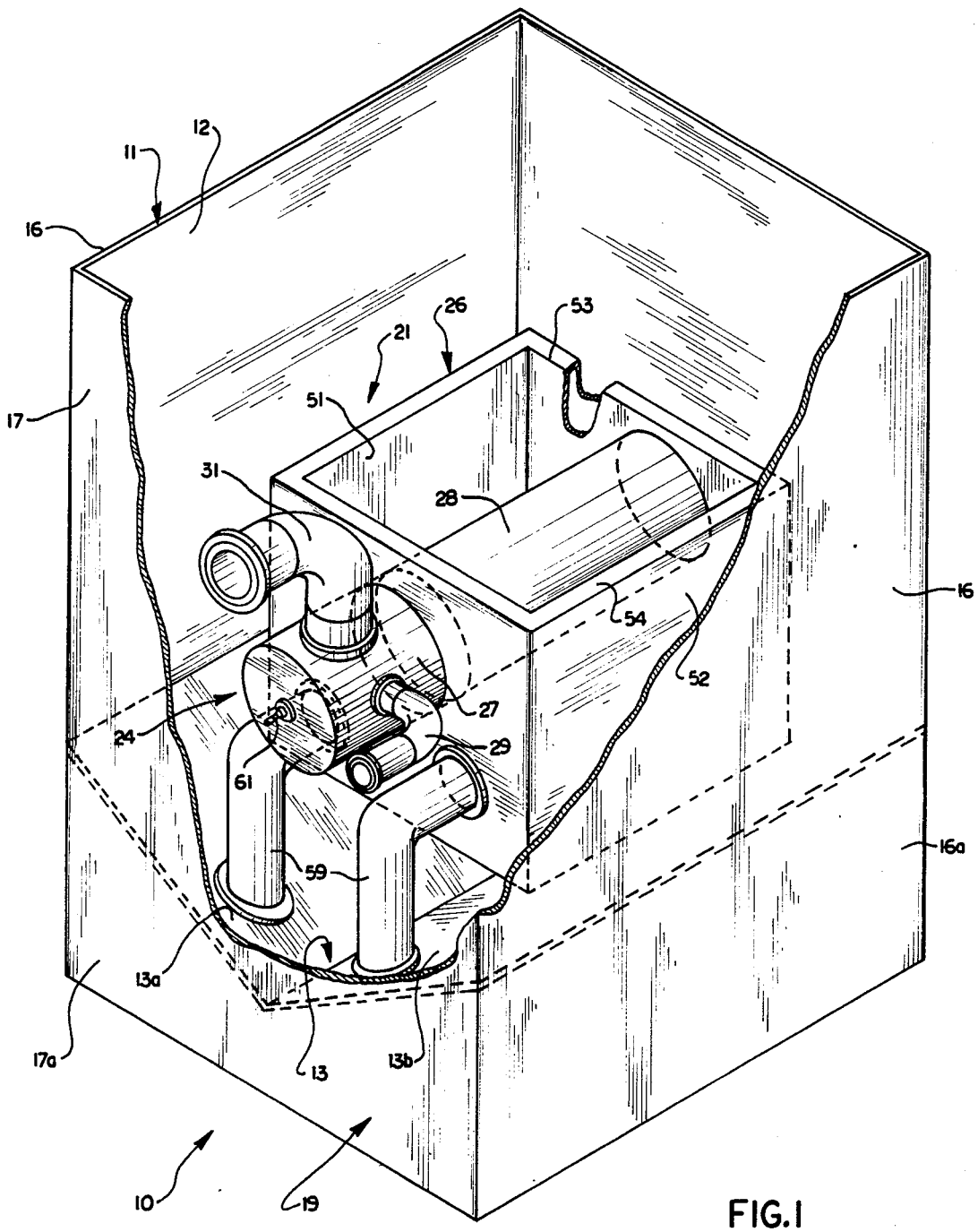
FIG. 1 is a somewhat schematic perspective view of a burner assembly in a deep fat fryer.
Figure 2:
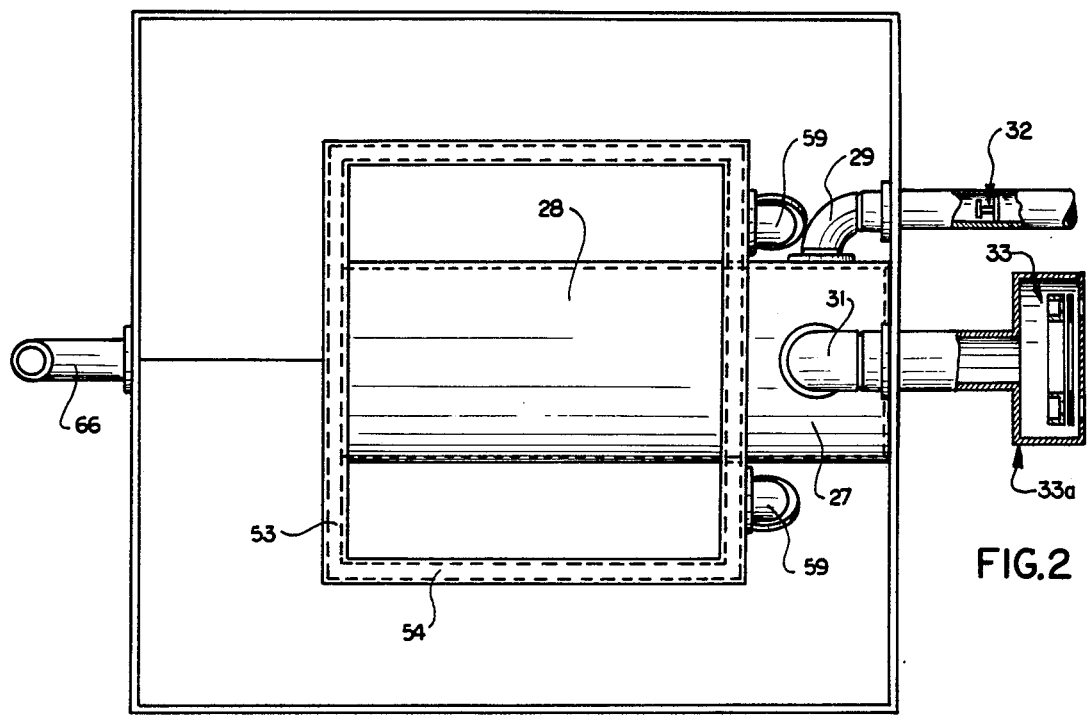
FIG. 2 is a plan view of the burner assembly in the frying vessel.

Referring now to the drawings there is illustrated a deep fat fryer 10 suitable for commercial use such as in a fast food store. The fryer 10 includes a cooking vessel or pot 11 which in the illustrated example represents a 14" wide unit having an input capacity of 70,000 B.T.U./hour. Typically, the top of the vessel 11 is supported at countertop level, for example, at 30" from the floor in a cabinet (not shown). The vessel 11 has a cavity 12 in the form of a rectangular box having besides its nominal width, for example, a length of 15⅛" and a depth of approximately 15". As used herein the term rectangular is used in a broad sense and includes within its meaning the term square. The vessel 11 is fabricated of a suitable material such as stainless steel. The vessel cavity 12 has a bottom 13 divided longitudinally into two panel sections 13a and 13b sloping towards its longitudinal center. Side walls 16 and end walls 17 which form the sides and ends of the cavity 12 extend below the cavity bottom 13 and are joined to a horizontal panel 18. These lower wall portions, designated 16a, 17a cooperate with the vessel bottom 13 and the panel 18 to form a closed fluid tight exhaust decoupler/muffler chamber 19. It will be understood that the panel 13 serves to form the bottom of the cavity 12 and the top of the chamber 19.

Figure 3:
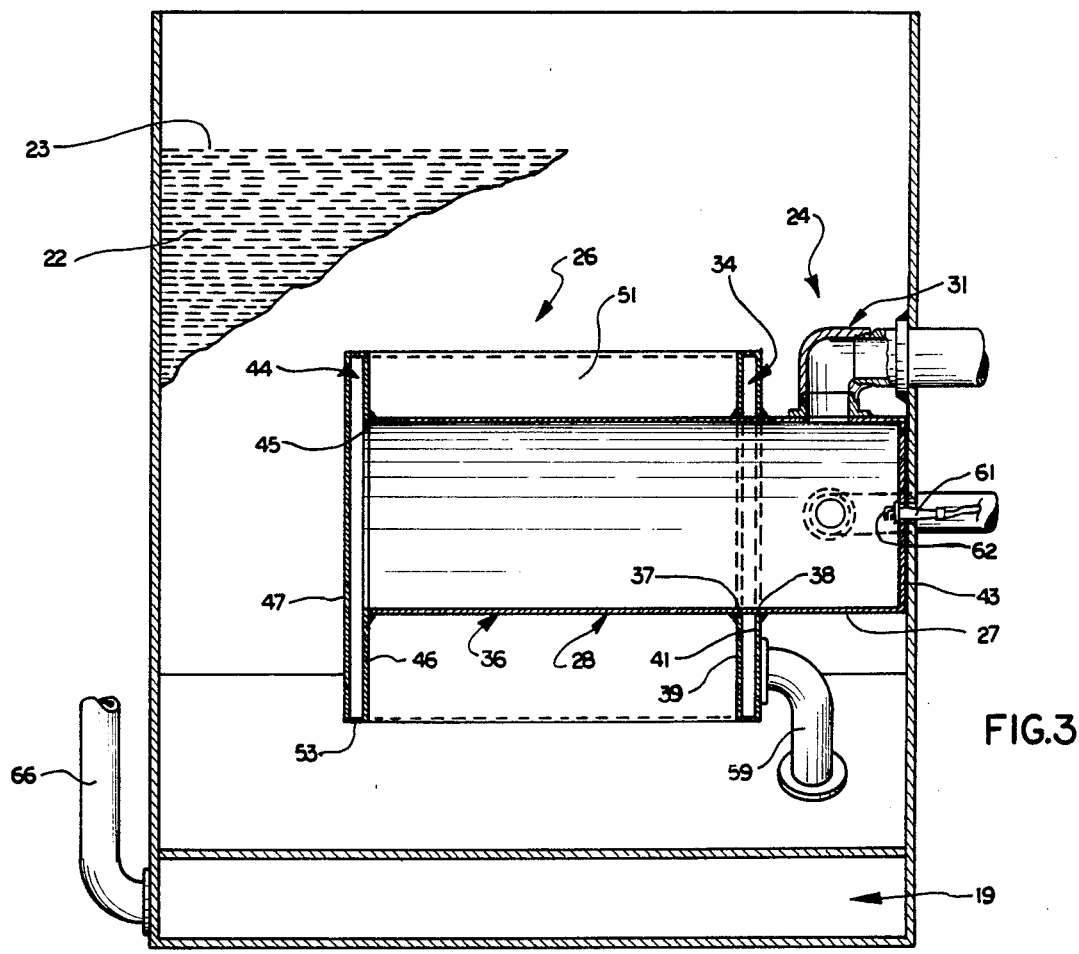
FIG. 3 is a side cross-sectional view of the burner assembly and frying vessel.
Figure 4:
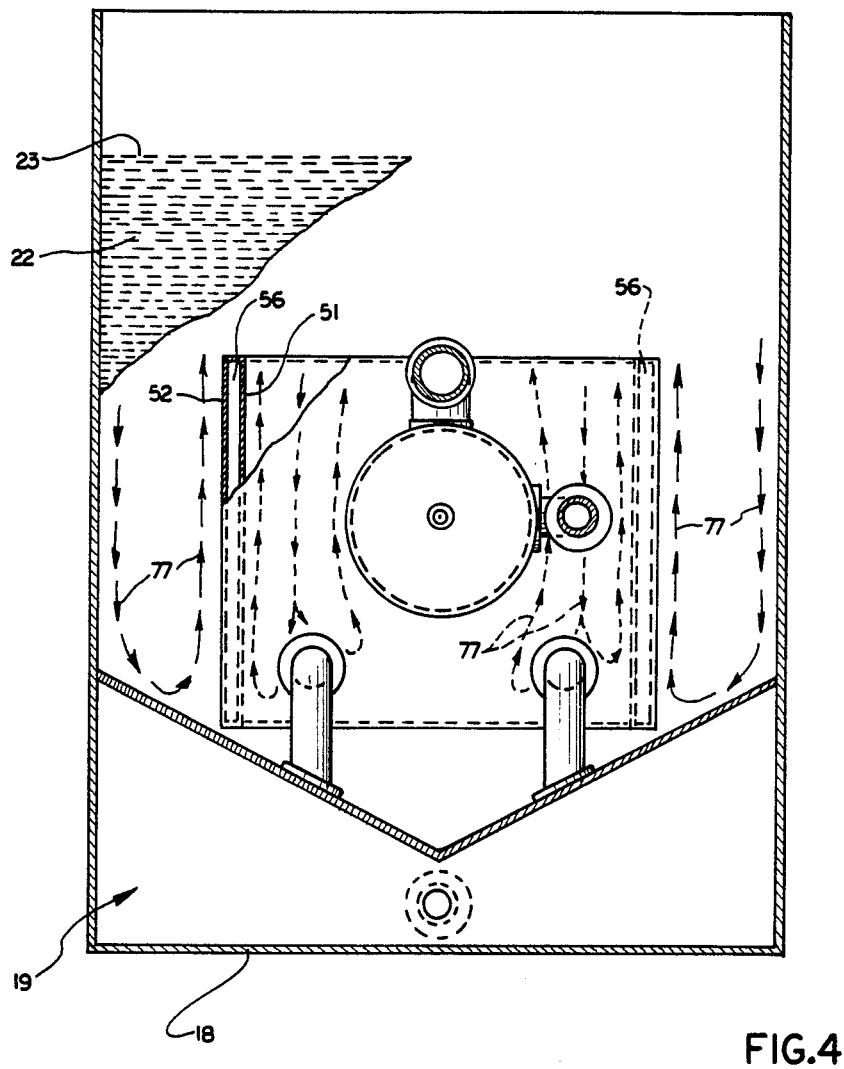
FIG. 4 is an end cross-sectional view of the burner assembly and frying vessel.

Disposed within the cavity 12 is a heater unit 21. As shown in FIG. 1, for example, the heater unit 21 is generally centered in the cavity and, as shown in FIG. 4 is suspended above the vessel bottom panel 13 but is well below the top of the vessel cavity 12 so that it is fully immersed in cooking oil 22 contained in the vessel. The normal level of cooking oil 22 is indicated at the line 23 shown in FIGS. 3 and 4. The heater unit 21 includes a pulse combustion burner 24 and a hollow plate heat exchanger 26. The heater unit 21 is formed of a suitable material such as steel and is conveniently fabricated as a weldment. The pulse combustion burner 24 includes a mixing chamber 27 and a combustion chamber 28 which in the illustrated embodiment are formed of a common cylindrical tube 36. An ell fitting 29, such as a ¾" plumbing ell, provides an inlet for gaseous fuel such as natural gas into the mixing chamber 27. Similarly, a larger ell 31, such as a 1¼" plumbing fitting provides an inlet for air into the mixing chamber 27.

The fuel and air inlets 29, 31 are each provided with flapper valves 32, 33 (FIG. 3) to allow inward flow of gas and prevent outward flow of gas in a known manner. The air flapper valve 33 is supported by an air valve housing 33a which is enclosed within an air box/decoupler (not shown). The boundary between the mixing and combustion chambers 27, 28 is arbitrarily taken at the plane of a manifold 34 of the heat exchanger 26. As indicated most clearly in FIG. 3, the tube 36 forming the main part of the mixing and combustion chambers 27, 28 passes through two aligned apertures 37, 38 in walls 39, 41 of the manifold 34 without directly communicating with it by virtue of its locally imperforate wall. The end of the tube 36 forming the mixing chamber 27 is closed by a circular plate 43 which is welded or otherwise sealed to the peripheral edge of the tube. At the end of the tube 36 remote from the mixing chamber 27, the tube communicates directly with another manifold 44 by connection with an aperture 45 in the inner of two walls 46, 47 of the manifold 44. At each manifold aperture 37, 38 and 45 the periphery of the tube 36 is welded or otherwise fully sealed to the respective manifold wall 39, 41 and 46.

The heat exchanger 26 is comprised primarily of vertical steel plates arranged in the configuration of a rectangular box without a top and bottom. The end sides of the box are formed by the manifolds 34, 44 while the other sides of the box are formed by spaced walls or panels 51, 52. It will be thus understood that each of the ends and sides of the boxed heat exchanger 26 has double walls. The double walls of each side and end manifold are sealed by narrow webs 53, 54 at both their upper and lower edges. At the corners of the boxed heat exchanger 26 the abutting edges of the interior walls 39, 46 and 51 of the sides and manifold ends are joined in a fluid tight manner. Similarly the abutting edges of the outer walls 41, 47 and 52 of the manifold ends and side walls are joined in a fluid tight manner. Thus, the interior space bounded by the manifold 44 communicates directly with interior passages 56 bounded by the side walls 51, 52 and associated webs 54 and communicates through these passages with the interior space of the manifold 34. A pair of ells 59 extend between the manifold plate or wall 41 and the bottom panels 13a, 13b. The ells 59 are welded or otherwise sealed at their ends to this plate 41 and the panels 13a, 13b to provide, through associated apertures in such wall and panels, communication between the interior of the manifold 34 and the exhaust decoupler/muffler chamber 19.

The total internal cross-sectional area of the ells or conduits 59 is substantially the same as the total cross-sectional area of the passages 56 for optimum fluid flow characteristics. By way of example, the outside dimensions of the illustrated heat exchanger box are: height $7\frac{1}{2}"$; length $8\frac{3}{4}"$ (in the longitudinal direction of the tube 36); and width $9"$. The interior spacing between the side wall panels 51, 52 is relatively narrow, for example, $\frac{1}{4}"$. The spacing between the manifold walls 39, 41 and 46, 47 is the same or in the case of the manifold 44 in the order of $\frac{3}{4}"$.

For operation of the heater unit 21, gaseous fuel is supplied to the inlet 29 and air is available to the inlet 31. On start up, the mixture of gaseous fuel and air is ignited by a spark plug 61 having an electrode 62 in the mixing chamber 27. Ordinarily, during use of the fryer 10 cooking oil 22 is maintained at a temperature of between 275° and 375°. A conventional thermostat sensing temperature of the oil 22 and related controls (not shown) supply the gaseous fuel to the inlet 29 when heating of the oil 22 is required. Once initiated by the spark plug 61 in response to the controls, pulse combustion in the combustion chamber 28 continues as long as fuel is supplied to the inlet 29. The principles of pulse combustion are sufficiently well known so as to not require a general explanation herein. It is sufficient to understand that positive pressure pulses in the combustion chamber 28 drive the combustion products successively through the manifold 44, narrow passages 56, the manifold 34, the ells 59 and finally the chamber 19 through a vent pipe 66 which exhausts ultimately to the outdoors. As the gaseous combustion products pass through these elements of the heat exchanger 26, they give up heat to the internal surfaces of the heat exchanger. This heat is diffused through the various walls of the heater 21 and is transferred to the oil 22 contacting its outer surfaces. The disclosed heater 21 has demonstrated an exceptionally high efficiency when compared with other prior art units. For instance, under essentially the same test conditions, the disclosed heater unit 21 yielded an efficiency of 81% while prior art units yielded efficiencies ranging from 40 to 50% with underfired burners and 68% for infrared units.

The high efficiency of the heater 21 is thought to be the result of several interrelated characteristics of the combustion chamber 28 and heat exchanger 26. Among these characteristics are the full immersion of the combustion chamber and other heat exchange surfaces upstream (with respect to the exhaust gas flow) of the decoupler/muffler chamber 19. The existence of a high ratio of surface area to cross-sectional flow area of the heat exchanger 26, particularly in the zone of the side passages 56 enhances performance. Especially beneficial to high efficiency is the narrow cross-section of these passages which promotes high turbulence and scrubbing of the gas boundary layers of the internal surfaces of these passages which otherwise impedes heat transfer. The major surfaces of the heat exchanger 26 are vertical and, consequently, promote strong vertical convection currents for good heat transfer to the oil and mixing of the oil. These convection currents are diagramatically illustrated in FIG. 4 by arrows 77. The reverse horizontal direction of gas flow in the passages 56 from that in the combustion chamber 28 tends to even out the temperature distribution in the vessel 11. The flow of the combustion products through the decoupler/muffler chamber 19 represents a third pass of such gases in the longitudinal direction (with reference to the axis of the combustion chamber 28) in heat exchange with the oil 22 to scavenge to even further amounts of heat of the products of combustion from the surfaces 13a, 13b.

Although the preferred embodiment of this invention has been shown and described, it should be understood that various modifications and rearrangements of the parts may be resorted to without departing from the scope of the invention as disclosed and claimed herein.

What is claimed is:

1. A deep fat fryer comprising an open top vessel for containing a quantity of cooking oil and a heater unit disposed within the vessel and adapted to be substantially immersed in the oil, said heater unit including a pulse combustion burner and a heat exchanger arranged to receive combustion products from the burner and deliver such products to an exhaust, the heat exchanger including a plurality of pairs of substantially flat plates extending substantially vertically in the vessel and forming relatively narrow passages having a height substantially greater than their narrow width dimension, said narrow passages being adapted to receive the combustion products of the burner, said pairs of plates being adapted to be in thermal contact with the surrounding oil and providing heat exchange between the combustion products and the oil, said plates being adapted to induce relatively strong convection currents in the oil to improve the efficiency of the heater unit.

2. A deep fat fryer as set forth in claim 1 wherein said heat exchanger includes an exhaust decoupler/muffler chamber connected by conduit means to said narrow passages for receiving the combustion products of said burner and said narrow passages have a total cross-sectional area substantially equal to that of said conduit means.

3. A deep fat fryer as set forth in claim 2 wherein said relatively narrow passages have a width dimension in the range of from ¼ to ¾ inch.

4. A deep fat fryer comprising a rectangular open top vessel for containing a quantity of cooking oil and a heater unit disposed within the vessel, the heater unit including a pulse combustion burner and a heat exchanger both being adapted to be substantially submerged in the oil, the heat exchanger having the configuration of a four sided rectangular, bottomless, topless box, each of the sides of the box forming a hollow chamber by virtue of having a double wall construction, the double walls of at least each of two opposite sides of the box being relatively closely spaced to define narrow passages, the hollow chamber of one end side of the box being interconnected to the hollow chamber of the opposite end side of the box through the hollow chamber of the adjacent sides of the box, the burner having its combustion chamber connected to discharge combustion products into said one end side of the box, the hollow chamber of said opposite end side of the box being connected to an exhaust, said heat exchanger being adapted to conduct combustion products received from said combustion chamber at said one end side hollow chamber successively through the one end side hollow chamber, the adjacent side hollow chambers, and the opposite end side hollow chamber to the exhaust, said double walls of each of the sides of the box being in thermal contact with the surrounding oil and providing heat exchange between the combustion products and the oil.

5. A deep fat fryer set forth in claim 4 wherein said opposite end side chamber is connected to said exhaust through conduit means having substantially the same cross-sectional area as said narrow passages.

6. A deep fat fryer as set forth in claim 4 wherein the spacing of the closely spaced double walls is less than one tenth the width of the box.

7. A deep fat fryer as set forth in claim 4 including an exhaust decoupler/muffler chamber beneath said vessel, said exhaust decoupler/muffler chamber and said vessel including a common wall, the heat exchanger being connected to exhaust into said exhaust decoupler/muffler chamber.

8. A deep fat fryer set forth in claim 4 wherein said combustion chamber is a generally cylindrical tube extending horizontally between said end sides of said heat exchanger box.

* * * * *